(12) United States Patent
Oe (10) Patent No.: US 8,023,916 B2
(45) Date of Patent: Sep. 20, 2011

(54) ONBOARD RECEPTION DEVICE, AND NOISE CANCELLATION METHOD FOR ONBOARD RECEPTION DEVICE

(75) Inventor: Junzo Oe, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 612 days.

(21) Appl. No.: 11/559,638

(22) Filed: Nov. 14, 2006

(65) Prior Publication Data

US 2007/0117529 A1 May 24, 2007

(30) Foreign Application Priority Data

Nov. 21, 2005 (JP) .................................. 2005-335712

(51) Int. Cl.
H04B 7/00 (2006.01)

(52) U.S. Cl. .................. 455/278.1; 455/63.1; 455/296; 375/346; 375/347; 375/349

(58) Field of Classification Search .................. 455/424, 455/425, 456.5, 456.6, 561, 550.1, 575.1, 455/278.1, 306, 296, 287, 304, 254, 501, 455/504, 208, 1, 423, 63.1, 67.11, 67.13, 455/114.2, 277.1, 283; 375/346, 348, 349, 375/347; 342/203, 421

See application file for complete search history.

(56) References Cited

U.S. PATENT DOCUMENTS

| | | | | |
|---|---|---|---|---|
| 3,387,222 A | * | 6/1968 | Beetle, Jr. et al. | 327/68 |
| 3,611,145 A | * | 10/1971 | O'Connor | 700/79 |
| 3,628,155 A | * | 12/1971 | Muzzi | 455/306 |
| 3,651,406 A | * | 3/1972 | Mohr et al. | 375/349 |
| 3,868,577 A | * | 2/1975 | Watt | 455/304 |
| 3,949,309 A | * | 4/1976 | Pecar | 455/296 |
| 4,181,892 A | * | 1/1980 | Dilley | 455/306 |
| 4,320,535 A | * | 3/1982 | Brady et al. | 455/278.1 |
| 4,817,197 A | * | 3/1989 | Shimizu et al. | 455/208 |
| 5,134,723 A | * | 7/1992 | Carson | 455/254 |
| 6,266,362 B1 | * | 7/2001 | Tuttle et al. | 375/141 |
| 6,675,004 B1 | * | 1/2004 | Waylett | 455/304 |
| 7,016,439 B2 | * | 3/2006 | Nuutinen et al. | 375/346 |
| 7,043,026 B1 | * | 5/2006 | Shiraishi et al. | 381/13 |
| 2003/0060219 A1 | * | 3/2003 | Parsiokas | 455/501 |
| 2004/0102174 A1 | * | 5/2004 | Kurita et al. | 455/307 |
| 2004/0185815 A1 | * | 9/2004 | Fukuda et al. | 455/296 |
| 2004/0260457 A1 | * | 12/2004 | Kawase et al. | 701/200 |
| 2005/0071159 A1 | * | 3/2005 | Boman et al. | 704/233 |
| 2006/0030287 A1 | * | 2/2006 | Vanderhelm et al. | 455/296 |

FOREIGN PATENT DOCUMENTS

JP 6-268539 9/1994

(Continued)

*Primary Examiner* — Duc Nguyen
*Assistant Examiner* — Charles Chow
(74) *Attorney, Agent, or Firm* — Oblon, Spivak, McClelland, Maier & Neustadt, L.L.P.

(57) ABSTRACT

This onboard reception device includes: a first receiver; a second receiver which is tuned to a second frequency which is different from a first frequency to which the first receiver is tuned, and whose reception level is low; a noise cancellation means which cancels noise included in a first demodulated received signal which is demodulated by the first receiver, based upon a second demodulated received signal which is observed by the second receiver; and an output means which outputs the first demodulated received signal in which noise has been cancelled, in a manner in which it can be appreciated by a user.

13 Claims, 10 Drawing Sheets

FOREIGN PATENT DOCUMENTS

| | | | |
|---|---|---|---|
| JP | 8-335915 | | 12/1996 |
| JP | 9-153827 | | 6/1997 |
| JP | 11-289264 | | 10/1999 |
| JP | 11289264 | * | 10/1999 |
| JP | 2001-36419 | | 2/2001 |
| JP | 2004-254184 | * | 9/2004 |
| WO | 2005/076483 | | 8/2005 |
| WO | WO 2005/076483 A1 | * | 8/2005 |

* cited by examiner

ONBOARD RECEPTION DEVICE, AND NOISE CANCELLATION METHOD FOR ONBOARD RECEPTION DEVICE

INCORPORATION BY REFERENCE

The disclosure of Japanese Patent Application No. 2005-335712 filed on Nov. 21, 2005, including the specification, drawings and abstract is incorporated herein by reference in its entirety.

BACKGROUND OF THE INVENTION

1. Field of Invention

The present invention relates to an onboard reception device which is endowed with a noise cancellation function.

2. Description of Related Art

In Japanese Patent Application Publication No. JP-A-06-268539, there is disclosed a noise elimination circuit which, along with controlling the amount of attenuation of an antenna circuit in response to a wide band AGC output signal which corresponds to the strengths of interference radio waves and of radio waves from a desired station, supplies the received signal from the above described antenna circuit to a high pass filter, detects the noise from this output signal, and eliminates the noise in this detected signal by the operation of a gate circuit.

However, there is the following problem with the method of eliminating the noise included in the received signal by, as in the above described related art, along with instantaneously cutting off the received signal by operating a gate circuit when noise has been detected, also performing interpolation processing so as to reduce the distortion of the received signal due to this instantaneous cutting off. That is, if noise is mixed in over a long span of time, or continually, then not only the noise survives, but also distortion of the received signal due to continuous instantaneous cutting off and interpolation becomes prominent, so that it is difficult to eliminate the noise in an effective manner.

SUMMARY OF THE INVENTION

The object of the present invention is to provide an onboard reception device and a noise cancellation method for an onboard reception device, which can eliminate noise which is contained in a received signal in an effective manner.

A first aspect of the present invention relates to an onboard reception device. This onboard reception device includes: a first receiver; a second receiver which is tuned to a second frequency which is different from a first frequency to which the first receiver is tuned, and whose reception level is low; a noise cancellation device which cancels noise included in a first demodulated received signal which is demodulated by the first receiver, based upon a second demodulated received signal which is observed by the second receiver; and an output device which outputs the first demodulated received signal in which noise has been cancelled, in a manner in which it can be appreciated by a user. Here, as concrete examples of output which may be appreciated, there may be cited radio, TV broadcasts, satellite broadcasts, and the like. In other words, appreciation by the user is not to be considered as being limited only to audio appreciation: it would also be acceptable for it to be appreciation of both audio and image.

In this first aspect of the present invention, there may be further included a pseudo carrier generator which generates a pseudo carrier at the second frequency, and a radio wave signal which is supplied to the second receiver via an antenna may be superimposed upon the pseudo carrier which is generated by the pseudo carrier generator.

Furthermore, a common antenna may be connected to the first receiver and the second receiver via a splitter or a filter.

Moreover, separate individual antennas may be connected to the first receiver and the second receiver.

Yet further, the antenna which is connected to the second receiver may be provided in the vicinity of a wide band noise source of the vehicle.

Still further, the second frequency may be a frequency which is not allocated for any type of broadcast or wireless communication.

Even further, the second frequency may be a frequency in the vicinity of a noise frequency which is emitted from a narrow band noise source of the vehicle.

Yet further, there may be further included a second frequency selection device which selects the second frequency from among a plurality of candidates.

It would also be acceptable for this second frequency selection device to select the second frequency from among frequencies on which no radio wave broadcasts can be received at the current vehicle position, based upon vehicle position information based upon GPS signals.

Even further, the operational state of the noise cancellation device may be changed over between ON and OFF according to the reception level of the first demodulated received signal.

Still further, it would also be acceptable, if the operational state of the noise cancellation device is changed over to OFF, for the second receiver to be tuned to a third frequency, which is a frequency different from the first frequency to which the first receiver is tuned, and in which the same information is included as in the first frequency; and, if the radio wave reception is better on the third frequency than on the first frequency, for the output device to output a signal based upon the second receiver.

Moreover, a second aspect of the present invention relates to a noise cancellation method for an onboard reception device. This method includes steps of: detecting a first frequency and a second frequency; creating a first demodulated received signal based upon the first frequency which has been detected; creating a second demodulated received signal based upon the second frequency which has been detected; canceling noise included in the first demodulated received signal based upon the second demodulated received signal; and outputting the first demodulated received signal in which noise has been cancelled.

According to the present invention there are provided an onboard reception device, and a noise cancellation method for an onboard reception device, which can eliminate noise which is contained in a received signal in an effective manner.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following, preferred embodiments for implementing the present invention will be explained with reference to the drawings.

Figure 1:
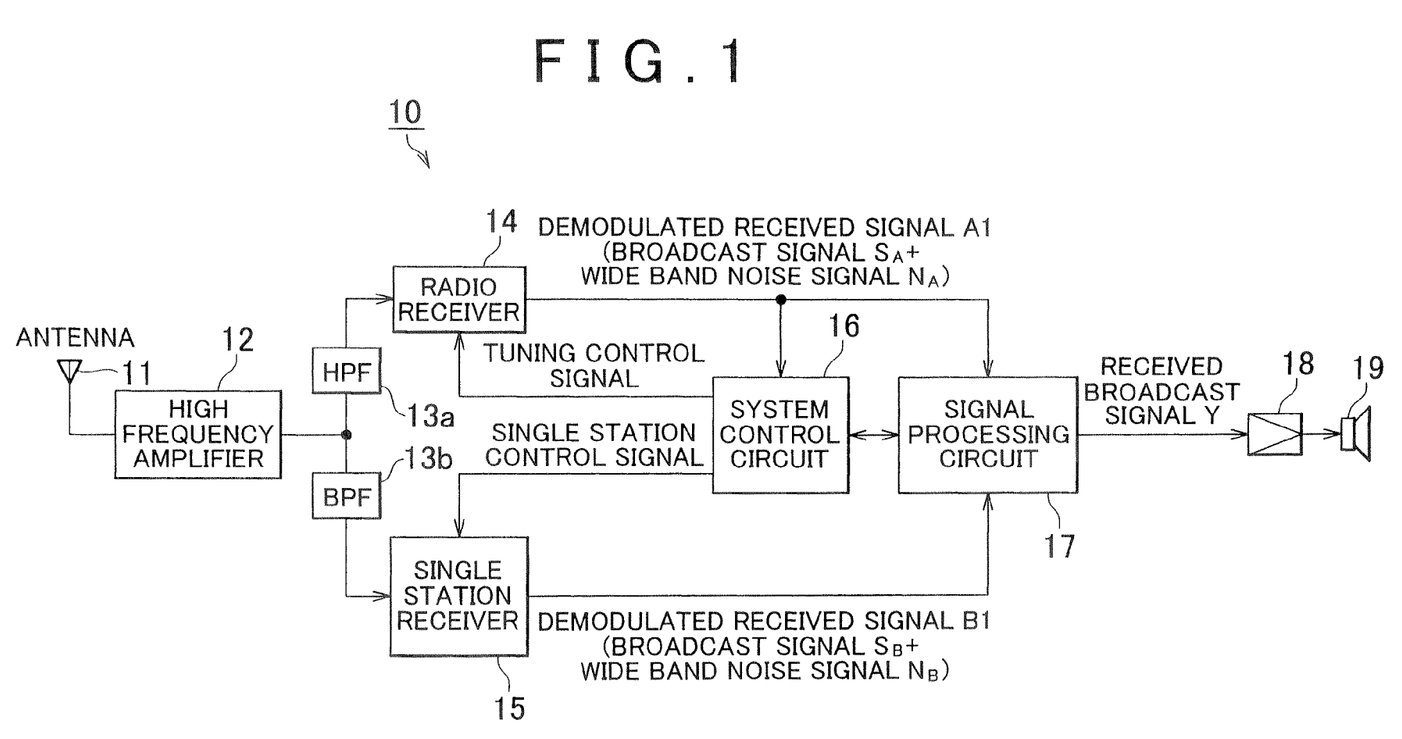
FIG. 1 is a structural system diagram showing the principal structure of an onboard reception device 10 according to a first embodiment.

FIG. 1 is a system structural diagram showing the principal structure of an onboard reception device 10 according to the first embodiment of the present invention. This onboard reception device 10 comprises an antenna 11. The antenna 11 is an antenna for transmitting and receiving radio waves, and is mounted upon a vehicle. It should be understood that it would also be acceptable for the antenna 11 to be a pole type antenna (or a helical antenna) which is fitted upon the roof, trunk, or bonnet or the like; and it would also be acceptable for it to be a linear antenna which is printed or embedded in the window glass or the like.

A high frequency amplifier 12 is connected as the stage after the antenna 11. And a radio receiver 14 is connected as a stage after the high frequency amplifier 12, via a high pass filter 13a. This radio receiver 14 may be one which comprises a tuner which is capable of receiving various types of radio broadcasts, such as normal FM broadcasts, FM multiplexed text broadcasts, AM broadcasts, TV, short wave broadcasts, and the like (i.e. a tuner which is capable of being tuned to various frequencies which are allocated for these various types of radio broadcasts). According to a tuning control signal from a system control circuit 16, the radio receiver 14 may be tuned to the frequency A desired by the user (hereinafter termed the "first frequency A"). This tuning control signal (for the first frequency A) is generated (determined) by setting actuation (tuning operation) by the user upon an actuation unit (not shown in the figures) which is provided upon an instrument panel or the like.

A single station receiver 15 is connected as a stage after the high frequency amplifier 12, via a band pass filter 13b. This single station receiver 15 may be of the same hardware structure as the radio receiver 14. As will be explained in detail hereinafter, the single station receiver 15 is used for canceling noise in the received signal which is received by the radio receiver 14. According to a single station selection signal from the system control circuit 16, the single station receiver 15 is tuned to a frequency B (hereinafter termed the "second frequency B") which is different from that of the radio receiver 14. This second frequency B is selected from the frequencies upon which broadcast waves are minimal, or upon which no broadcasting stations are present. For example, with Japanese AM broadcasts 513 kHz may be selected as the second frequency B, and with Japanese FM broadcasts 81.0 mHz may be selected.

It should be understood that, in this embodiment, the second frequency B is set to a smaller frequency (for example 513 kHz) than the smallest frequency in the entire bandwidth (i.e. all the frequencies which can be tuned) which the first frequency A can assume. For this, the single station receiver 15 is made so as to receive a low frequency band which does not pass through the high pass filter 13a, via a band pass filter whose pass band is set corresponding to the second frequency B. Due to this, it becomes possible for the entire bandwidth which the first frequency A can assume to be received by the radio receiver 14 via the high pass filter 13a, without loss. However, it would also be acceptable to arrange to divide the signal which is received by the antenna 11 with a splitter, thus supplying it both to the radio receiver 14 and to the single station receiver 15. In this case, loss of the signal which is supplied to the radio receiver 14 must be compensated, and it is accordingly desirable to increase the level of amplification which is provided by the high frequency amplifier 12.

In FIG. 1, the signal which is received by the antenna 11 passes through the high frequency amplifier 12 and is amplified thereby. Next, the signal which has been received by the antenna 11 is divided between the radio receiver 14 and the single station receiver 15, via the high pass filter 13a and the band pass filter 13b. A broadcast signal $S_A$ of which the first frequency A is the carrier wave is demodulated by the radio receiver 14, and a first demodulated received signal A1 is outputted to the next stage. And a broadcast signal $S_B$ of which the second frequency B is the carrier wave is demodulated by the single station receiver 15, and a second demodulated received signal B1 is outputted to the next stage. It should be understood that this first demodulated signal A1 and this second demodulated signal B1 may be analog signals; or it would also be acceptable for them to be A/D converted into digital signals.

A signal processing circuit 17 is connected as the stage after the radio receiver 14 and the single station receiver 15. As described above, the first demodulated received signal A1 and the second demodulated received signal B1, which have been demodulated and generated by the radio receiver 14 and the single station receiver 15 respectively, are inputted to this signal processing circuit 17. The signal processing circuit 17 performs noise elimination processing upon the first demodulated received signal A1 based upon the second demodulated received signal B1 as will be described hereinafter, and creates a received broadcast signal Y in which the noise included in the first demodulated received signal A1 has been cancelled (or eliminated). The received broadcast signal Y which has been created in this manner is amplified by an audio signal amplification circuit 18, and is outputted via a speaker 19 which is provided in the vehicle. By doing this, viewing of the received broadcast signal by the user is implemented.

Figure 2A:
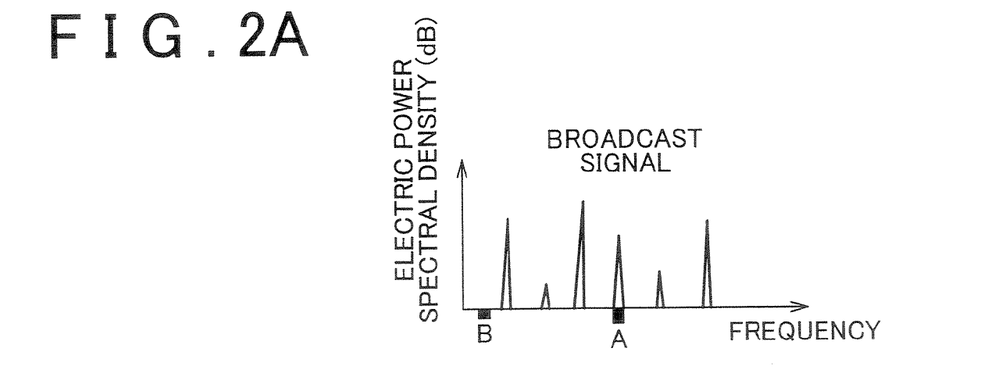
FIG. 2A is a figure showing an example of the frequency spectrum of a broadcast signal.
Figure 2B:
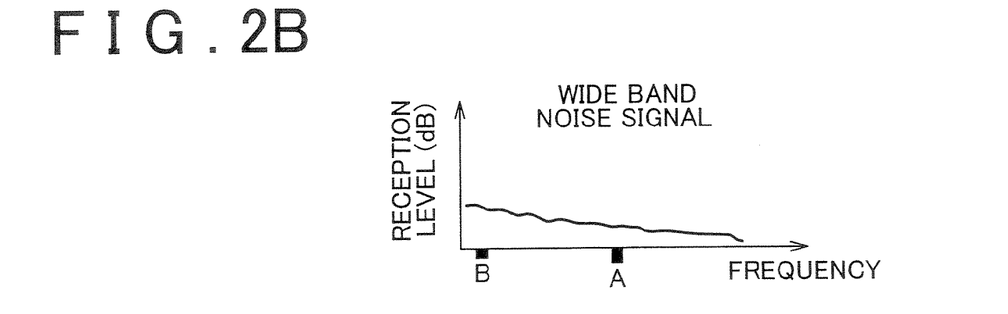
FIG. 2B is a figure showing an example of the frequency spectrum of a wide band noise signal.

Now, the wide band noise signal which is included in the first demodulated received signal A1 will be explained. FIG. 2A shows an example of the frequency spectrum of a broadcast signal, and FIG. 2B shows an example of the frequency spectrum of a wide band noise signal.

As shown in FIG. 2A, the first frequency A is any one of the frequencies which can be tuned, and accordingly the reception level of the broadcast signal $S_A$ becomes high. On the other hand, as shown in FIG. 2B, the frequency spectrum of the wide band noise signal originates in the wide band nature of the wide band noise, and has a comparatively constant reception level across a wide band, so that it also has a high reception level at the first frequency A. Accordingly, this type of wide band noise also has a high reception level at the first frequency A. Due to this, when the first frequency A is inputted via the antenna 11, a wide band noise signal comes to be included in the first demodulated received signal A1 which is outputted from the radio receiver 14, and deterioration of the signal product quality is engendered.

Figure 3A:
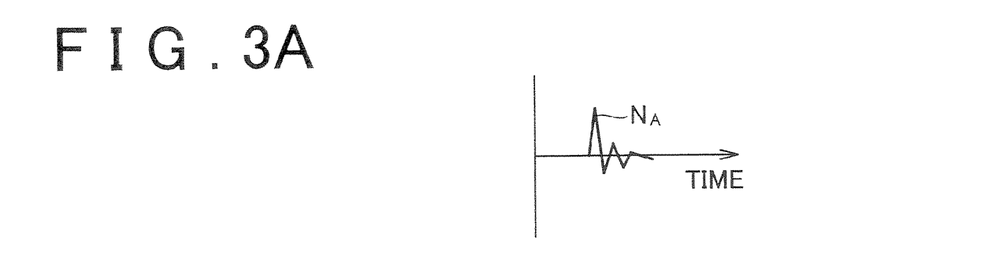
FIGS. 3A and 3B are figures showing correlations between the time axis characteristic of a wide band noise signal $N_A$ and the time axis signal of a wide band noise signal $N_B$.

FIG. 3A is a figure showing the time axis characteristic of the wide band noise signal $N_A$ which is observed at the first frequency A. In the wide band noise which is inputted via the onboard antenna 11, apart from external noise emitted from lightning, high voltage electricity transmission lines, or road signal control panels, there is also included noise emitted from various types of electric motor (for example an EPS motor, a drive motor for a hybrid automobile, or the like), or from the ignition system of the engine, or from various types of switch devices and inverters and the like. For example, in the case of a hybrid automobile to which a high voltage battery is mounted, as sources which generate high voltage system switching noise, there are included various types of converter and inverter which are present between the motor and the high voltage battery, and various types of converter which are present between the high voltage battery and other types of battery (for example, a battery for auxiliary equipment).

Figure 4A:
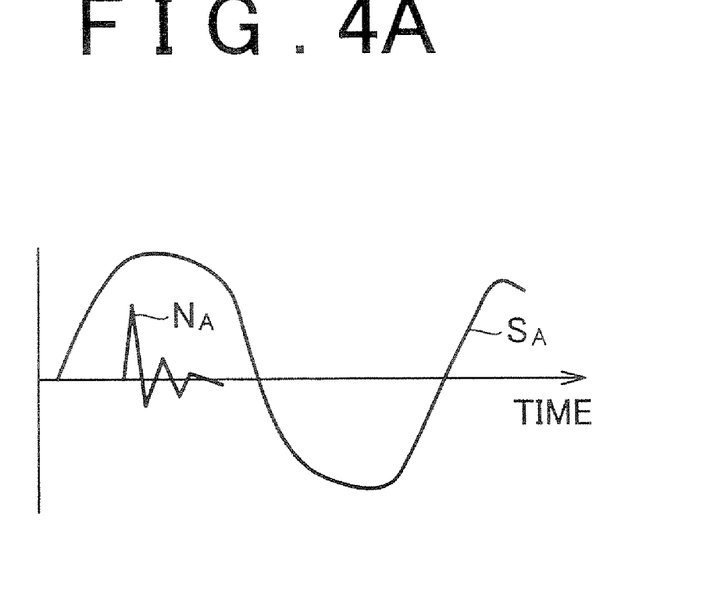
FIG. 4A is a figure showing the time axis characteristic of a first demodulated received signal A1 (A1=$S_A$+$N_A$), in which the wide band noise signal $N_A$ is included.

FIG. 4A is a figure showing the time axis characteristic of the first demodulated received signal A1 ($A1=S_A+N_A$), in which the wide band noise signal $N_A$ shown in FIG. 3A is included. As shown in FIG. 4A, sometimes the various types of wide band noise as described above are included in the first demodulated received signal A1 over a comparatively large span of time, and sometimes they are included in the first demodulated received signal A1 continually in a short cycle. In such cases, it is not possible effectively to eliminate the noise with a technique such as the one described above in the section of this specification "Description of the Related Art".

By contrast, the signal processing circuit 17 according to this embodiment is characterized by effectively canceling (or eliminating) the wide band noise signal $N_A$ which is included in the first demodulated received signal A1 by using the second demodulated received signal B1. In the following, the noise elimination processing which is implemented by this signal processing circuit 17 will be explained.

As shown in FIG. 2A, the second frequency B is a frequency at which broadcast waves are minimal or no broadcasting station is present, and accordingly the reception level of the broadcast signal $S_B$ is minimal or zero. On the other hand, as described above, the wide band noise signal, as shown in FIG. 2B, has a comparatively constant reception level over a wide band, and also has a high reception level at the second frequency B. Accordingly, this type of wide band noise signal comes also to be included in the second demodulated received signal B1 which is outputted from the single station receiver 15.

Figure 3B:
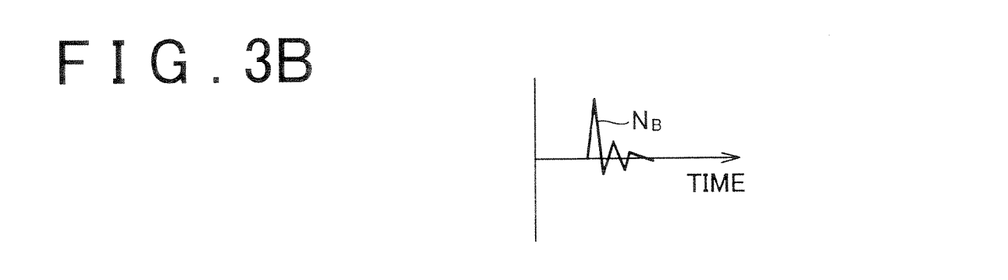

FIG. 3B is a figure showing the time axis characteristic of the wide band noise signal $N_B$ which is observed at the second frequency B over the same observation time period as that of FIG. 3A. As will be understood from FIGS. 3B and 3A, the wide band noise signal $N_A$ which is observed at the first frequency A and the wide band noise signal $N_B$ which is observed at the second frequency B are correlated in their time axis characteristic. It should be understood that since, in the example shown in these figures, as shown in FIG. 2B, the electrical power spectral density of the wide band noise at the second frequency B is higher than the electrical power spectral density of the same wide band noise at the first frequency A, accordingly the amplitude of the wide band noise signal $N_B$ comes to be greater, to a certain extent, than the amplitude of the wide band noise signal $N_A$.

Figure 4B:
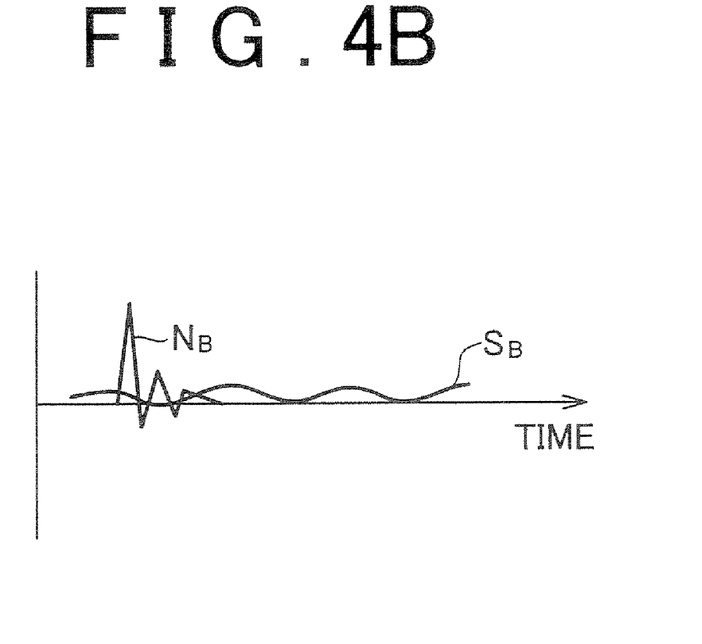
FIG. 4B is a figure showing the time axis characteristic of a second demodulated received signal B1 ($B_1$=$S_B$+$N_B$), in which the wide band noise signal $N_B$ is included.

FIG. 4B a figure showing the time axis characteristic of the second demodulated received signal B1 ($B1=S_B+N_B$), in which the wide band noise signal $N_B$ shown in FIG. 3B is included. From FIGS. 4B and 4A, it will be understood that, even though the wide band noise is observed at the two different frequencies A and B, it is mixed into the demodulated received signals (A1, B1) at their respective frequencies as the signals ($N_A$, $N_B$) which have mutually correlated amplitudes and phases.

Figure 5:
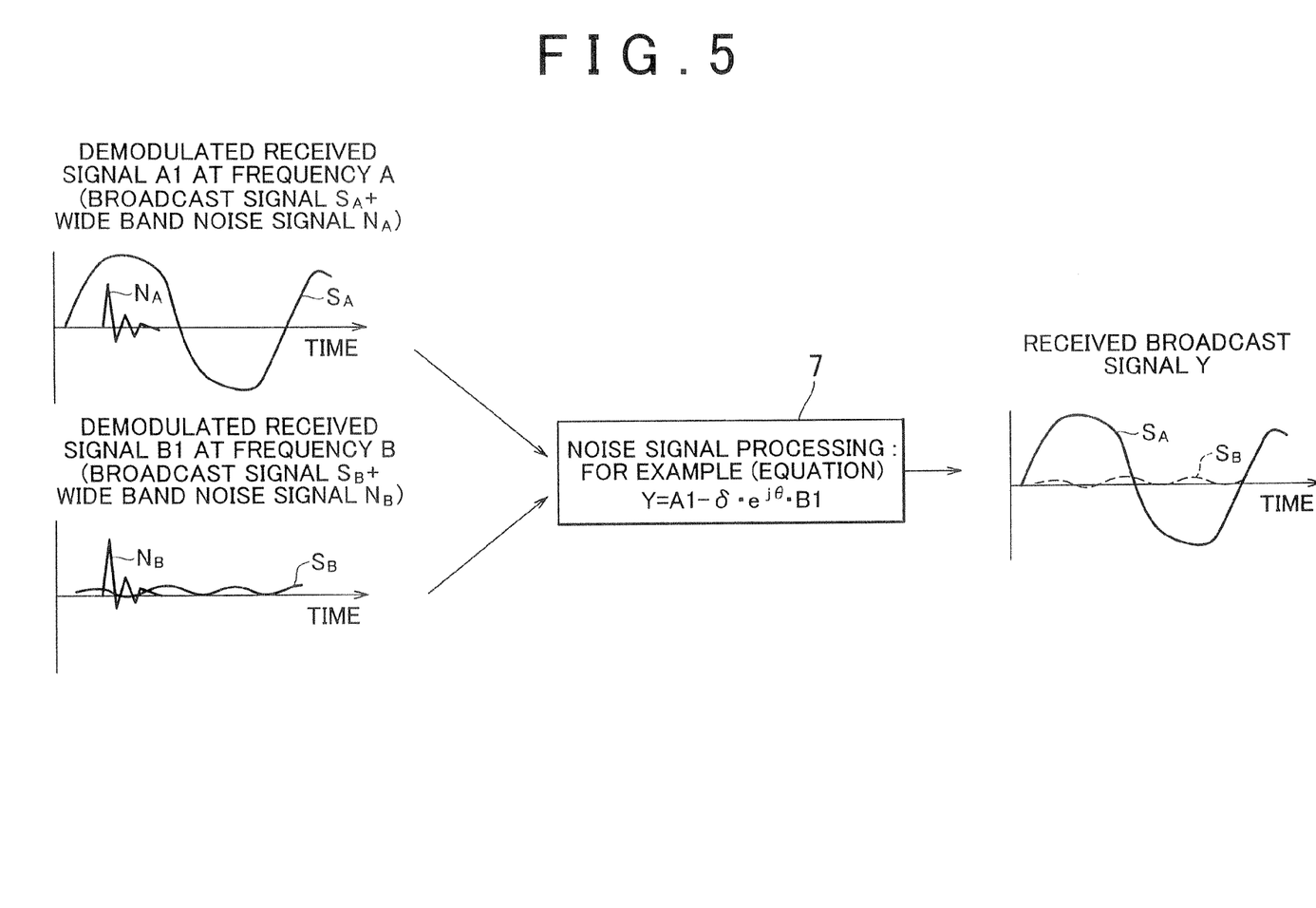
FIG. 5 is a block diagram schematically showing noise elimination processing by a signal processing circuit 17.

FIG. 5 is a block diagram schematically showing the noise elimination processing by the signal processing circuit 17. The wide band noise signal $N_A$ which is included in the first demodulated received signal A1 is eliminated and canceled by this signal processing circuit 17, by employing the correlation between the wide band noise signal $N_A$ which is included in the first demodulated received signal A1 and the wide band noise signal $N_B$ which is included in the second demodulated received signal B1.

For example, due to signal processing by the signal processing circuit 17 as expressed by the equation $Y=A1-d \cdot e^{j0} \cdot B1$, a received broadcast signal Y is outputted as shown in FIG. 5. Here, d and 0 are respectively an amplitude compensation coefficient and a phase compensation coefficient, and they are matched so that the wide band noise signal $N_A$ becomes minimal. Due to this, as shown in FIG. 5, the wide band noise signal $N_A$ which is included in the first demodulated received signal A1 is substantially eliminated, and it is possible to extract only the broadcast signal $S_A$ which is included in the first demodulated signal A1. It should be understood that although, as shown in FIG. 5, the broadcast signal $S_B$ which is included in the second demodulated received signal B1 remains in the received broadcast signal Y which is outputted from the signal processing circuit 17, since as described above the reception level of this broadcast signal $S_B$ is minimal or zero, accordingly no very large influence is exerted upon the quality of the final received broadcast signal Y.

In this manner, according to this embodiment of the present invention, even if the wide band noise signal $N_A$ is included in the first demodulated received signal A1 other than momentarily, it is still possible to eliminate the wide band noise signal $N_A$ which is included in the first demodulated received signal A1 in an effective manner. As this type of case there may be cited, for example, the case in which the wide band noise signal $N_A$ is included in the first demodulated received signal A1 over a comparatively large span of time, or the case in which it is included in the first demodulated received signal A1 continually at a short cycle, or the like. The reason why, is that it is possible to eliminate the wide band noise signal $N_A$ which is included in the first demodulated received signal A1 in an effective manner, by utilizing the correlation with the wide band noise signal $N_B$ which is included in the second demodulated received signal B1 as well, in the same way as when the wide band noise signal $N_A$ is momentarily included in the first demodulated received signal A1.

It should be understood that it would also be acceptable for the functions (the signal processing) which are implemented by the signal processing circuit 17 (and the same goes for the system control circuit 16) to be implemented in hardware by an attenuator or the like, based upon optimum compensation coefficients (for amplitude compensation and phase compensation) which are set in advance according to the second frequency B. Or, it would also be acceptable to implement these functions with a DSP (Digital Signal Processor), based upon software which is programmed so as to cancel only the noise signals whose correlation is strong. In this case, it would be acceptable to match the compensation coefficients for amplitude and for phase in a dynamic manner.

Furthermore, in this embodiment, it would also be acceptable, if the reception level (the S meter signal) at the radio receiver 14 is high, and the broadcast signal $S_A$ which is being received is sufficiently large with respect to the wide band noise signal $N_A$, for the above described noise elimination processing by the signal processing circuit 17 to be interrupted or stopped. In this case, it would also be acceptable for the single station receiver 15 to be utilized for implementing a network following function. Here by a network following function, there is meant a function of discovering, with the single station receiver 15, other stations upon which the same broadcast is being emitted as the broadcast upon the broadcasting station which is currently being received by the radio receiver 14, and of changing over to the station (i.e. to the frequency) upon which the receivability of the radio waves is most satisfactory.

Furthermore, in this embodiment, as shown in FIG. 2B, since the frequency spectrum of the wide band noise signal which is created by the vehicle has a higher reception level in the low frequency region than in the high frequency region, accordingly the second frequency B is set to a frequency (for example 513 kHz) upon which there is no broadcasting station upon the low frequency side. By doing this, it is possible to select the second frequency B so that the reception level of the wide band noise signal $N_B$, which is highly correlated with the wide band noise signal $N_A$, becomes as high as possible. However, it would also be acceptable to provide, instead of the high pass filter 13a, a low pass filter, and to arrange to set the second frequency to a frequency which is higher than the maximum frequency which the first frequency can assume, and moreover which is a frequency (for example 81.0 MHz) upon which the broadcast waves are minimal or no broadcasting station is present.

Figure 6:
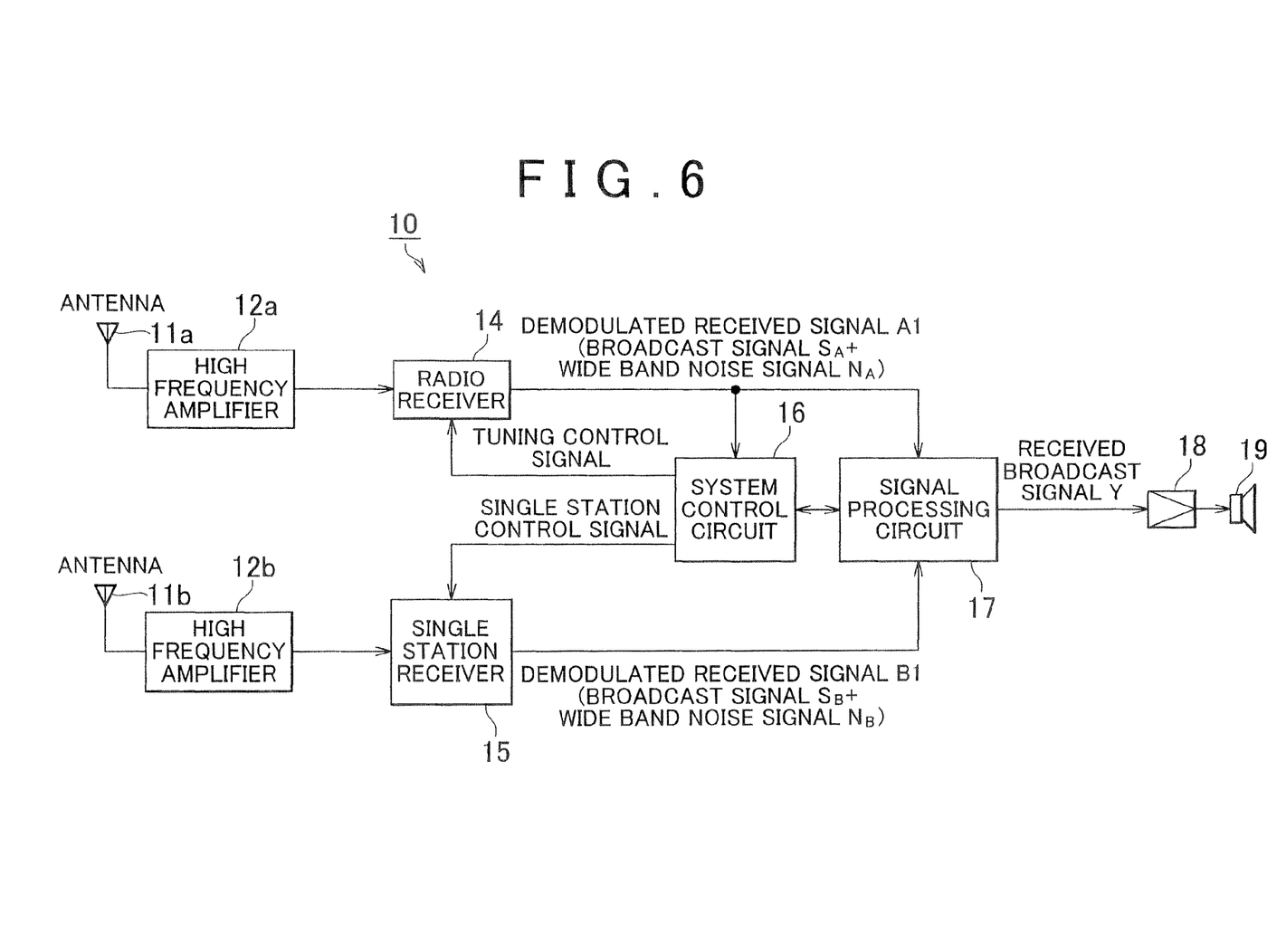
FIG. 6 is a structural system diagram showing the principal structure of an onboard reception device 10 according to a second embodiment.

FIG. 6 is a structural system diagram showing the principal structure of an onboard reception device 10 according to a second embodiment of the present invention. In the following, to structures which are the same as ones described with reference to the first embodiment, the same reference symbols are affixed, and explanation thereof is curtailed. In this second embodiment each of the radio receiver 14 and the single station receiver 15 is connected to its own separate antenna; so that in this feature this second embodiment differs from the first embodiment described above, in which the common antenna 11 is connected both to the radio receiver 14 and also to the single station receiver 15.

In concrete terms, as shown in FIG. 6, the radio receiver 14 is connected via a high frequency amplifier 12a as the stage after an antenna 11a, and the single station receiver 15 is connected via a high frequency amplifier 12b as the stage after an antenna 11b. It should be understood that, in this embodiment, since individual signals are supplied from the separate antennas 11a, 11b to the radio receiver 14 and the single station receiver 15, it is not necessary to give any consideration to losses of the radio waves, and accordingly the various filters 13a, 13b which are employed in the first embodiment described above are not required.

The antenna 11a is set up in a location in which the radio wave reception is satisfactory, for example upon a roof portion or the like, just as in the case of the antenna 11 of the first embodiment.

On the other hand, although it would also be acceptable to set up the antenna 11b in a location in which the radio wave reception is satisfactory, just like the antenna 11a, it would also be acceptable to set it up in a spot in which the radio wave reception is not satisfactory. This is because, as described above, it is desirable for the second demodulated received signal B1 which is received via the antenna 11b and which is to be included in the first demodulated received signal A1 to include the wide band noise signal $N_B$ whose correlation with the wide band noise signal $N_A$ is high, and moreover it is desirable for the component of the broadcast signal $S_B$ which is to be included in the received broadcast signal Y to be as small as possible. In other words, this is because selecting the second frequency B so that the reception level of the broadcast signal $S_B$ which survives in the received broadcast signal Y becomes as small as possible, and moreover so that the reception level of the wide band noise signal $N_B$ which has a high correlation with the wide band noise signal $N_A$ becomes as large as possible, is able efficiently to prevent deterioration of the quality of the signal originating in the wide band noise signal $N_A$ or the broadcast signal $S_B$.

From this aspect, there is an advantage with a structure in which the antenna 11b and the antenna 11a are set up in approximately the same location, since it is thereby possible reliably to acquire the wide band noise signal $N_B$ which is correlated with the wide band noise signal $N_A$. However, this is disadvantageous due to the aspect that the freedom in selection of the second frequency B becomes smaller (the aspect that the necessity arises to select a frequency upon which the broadcast waves are minimal or no broadcasting station is present, just as in the case of the first embodiment). On the other hand, with a structure in which the antenna 11b is set up in a closed space (such as in the trunk or under the bonnet) so that the broadcast radio waves cannot be received, there is an advantage from the point of view that the freedom in selecting the second frequency B is large. However, sometimes it is also the case, according to the position in which the antenna 11b is disposed, that it may not be possible to acquire the wide band noise signal $N_B$ which is correlated with the wide band noise signal $N_A$. Due to this, with the latter structure, desirably, the antenna 11b is disposed in a location in which it is possible reliably to acquire the wide band noise signal $N_B$ which is correlated with the wide band noise signal $N_A$, in other words, in the vicinity of the source which generates this wide band noise. For example, in the case of a hybrid automobile, it is preferred to locate the antenna 11b in the neighborhood of the various converters and inverters, or in the neighborhood of the high voltage electrical wiring (i.e. the high voltage harness). In this case, as the antenna 11b, for example, the method may also be adopted of connecting the input stage of the single station receiver 15 via a capacitor to the wire harness, and of thus extracting the high voltage switching noise of the hybrid automobile directly.

It should be understood that, in this embodiment, if the reception level at the radio receiver 14 is high, and a sufficiently large broadcast signal $S_A$ is being obtained with respect to the wide band noise signal $N_A$, it would also be acceptable to interrupt or to stop the above described noise elimination processing by the signal processing circuit 17. In this case, it would also be acceptable for the single station receiver 15 to be employed for implementing a network following function, with a structure in which the antenna 11b is set up in a location in which the reception of the radio waves is satisfactory, just as in the case of the antenna 11a.

Furthermore, with a structure in which the antenna 11b is installed in a position in which the reception of the radio waves is satisfactory, and which is different from the position in which the antenna 11a is installed, it is also possible to perform diversity reception by using the single station receiver 15 (the antenna 11b) and the radio receiver 14 (the antenna 11a) selectively. For example, if the reception level at the radio receiver 14 has become lower than a reference value, the single station receiver 15 may be tuned to the first frequency A. It would also be acceptable to arrange to interchange the roles of the single station receiver 15 and the radio receiver 14 if, at this time, the reception level at the single station receiver 15 on the first frequency A is higher than the reference value. In this case, the radio receiver 14 is tuned to the second frequency B. The noise signal included in the demodulated received signal which is outputted from the single station receiver 15 then is eliminated or cancelled by the signal processing circuit 17, based upon the demodulated received signal which is outputted from the radio receiver 14.

Figure 7:
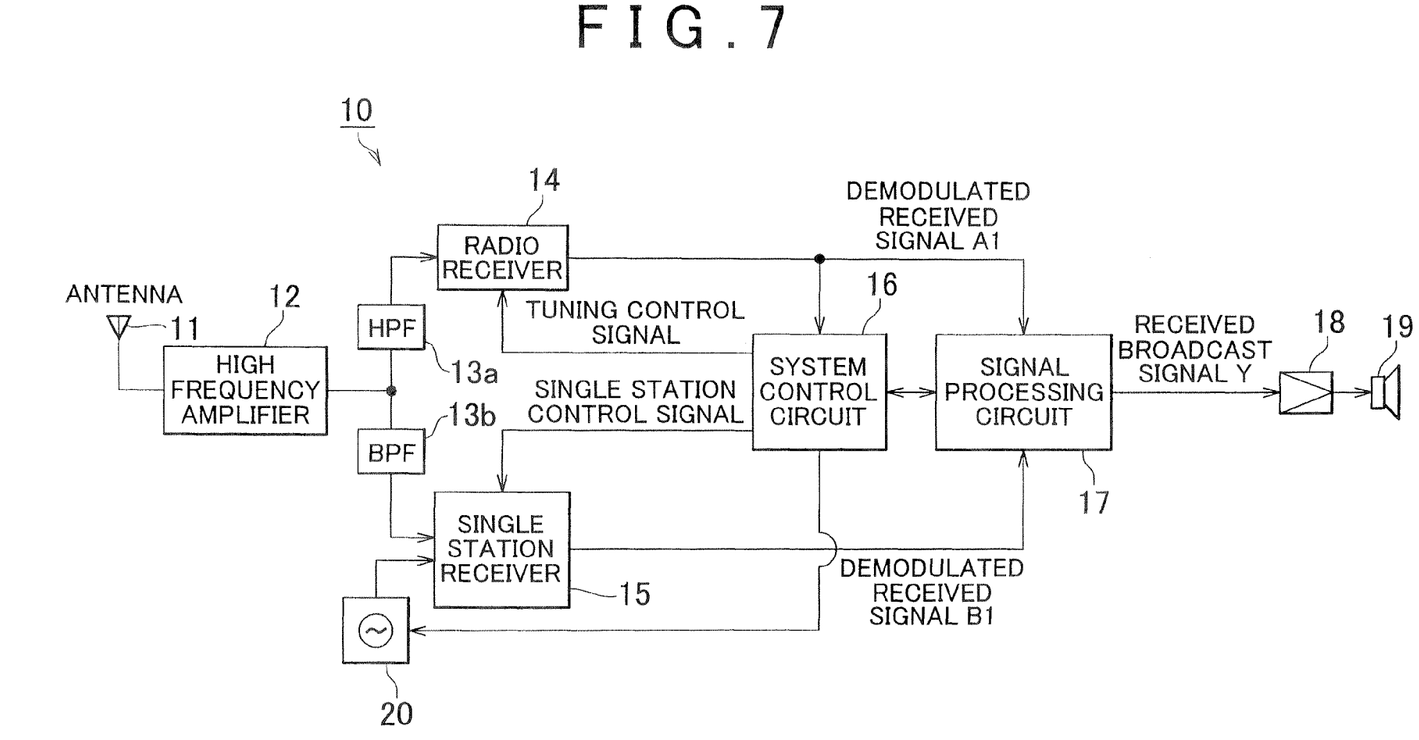
FIG. 7 is a structural system diagram showing the principal structure of an onboard reception device 10 according to a third embodiment.

FIG. 7 is a structural system diagram showing the principal structure of an onboard reception device 10 according to a third embodiment of the present invention. In the following, to structures which are the same as ones described with reference to the first embodiment, the same reference symbols are affixed, and explanation thereof is curtailed. In this third embodiment a pseudo broadcast carrier generator 20 is provided, so that, in this feature, this third embodiment differs from the first embodiment described above.

A pseudo broadcast carrier generator 20 generates a pseudo broadcast carrier upon the second frequency B. This pseudo broadcast carrier is a signal which expresses a carrier wave of a broadcast radio wave of the second frequency B in dummy form, and naturally it is not modulated by the broadcast signal.

This pseudo broadcast carrier generator 20 is connected to the input side of the single station receiver 15. In other words, the radio wave signal which is inputted via the antenna 11 is superimposed over the pseudo broadcast carrier which is generated by the pseudo broadcast carrier generator, and is inputted to the demodulation circuit (i.e. the detection unit) of the single station receiver 15.

Figure 8:
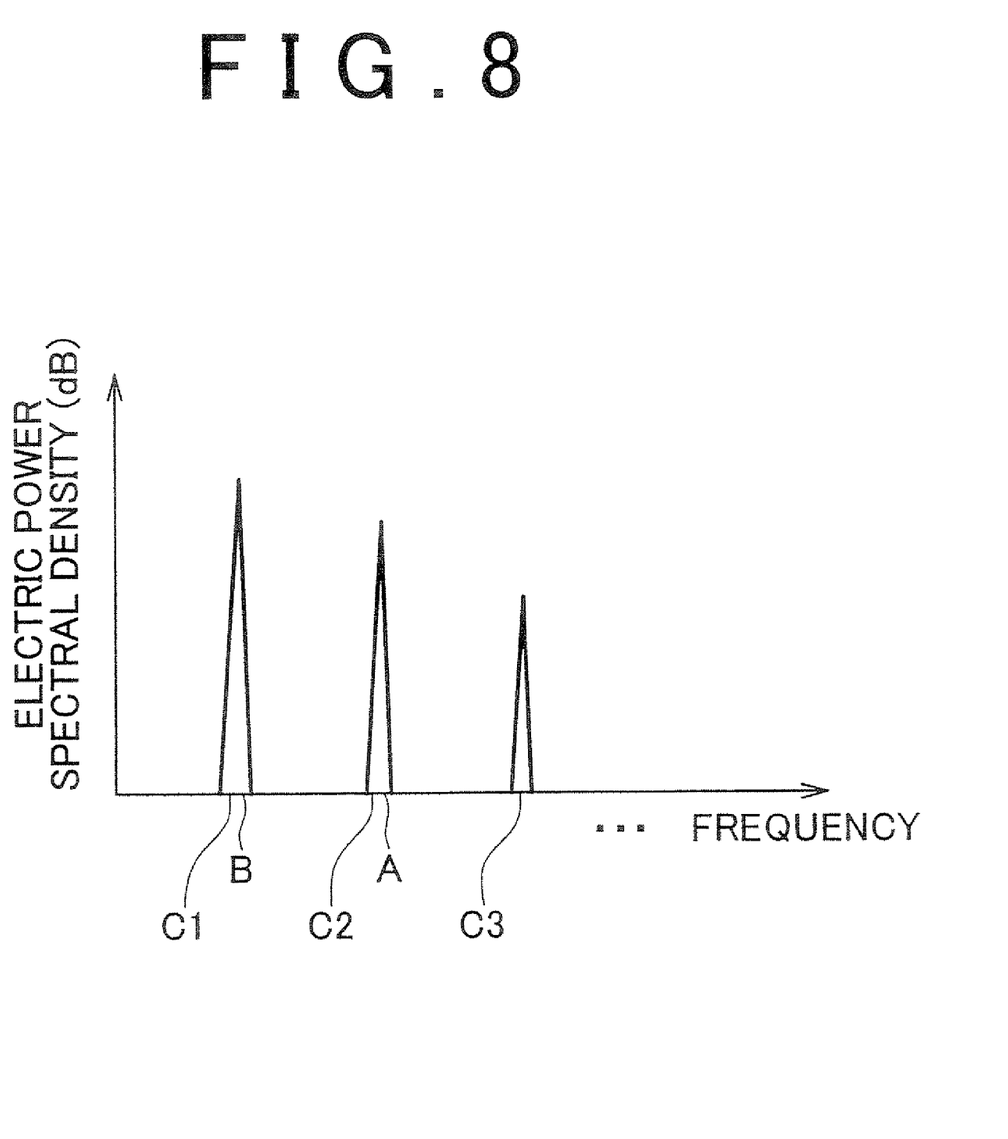
FIG. 8 is a figure showing an example of the frequency spectrum of a narrow band noise signal.

Now, a narrow band noise signal which is included in the first demodulated received signal A1 will be explained. FIG. 8 is a figure showing an example of the frequency spectrum of this narrow band noise signal. Generally, due to the narrow band nature of narrow band noise, in the frequency spectrum of a narrow band noise signal, the electrical power spectral density becomes high in narrow bands, and peaks are generated by the high frequency components of the noise at a plurality of separated frequencies C1, C2, . . . (hereinafter termed narrow band noise frequencies). As narrow band noise which is inputted via the onboard antenna 11, the noise which is emitted by an oscillation circuit or a clock circuit which is used in a micro computer or the like may be considered to be representative.

No narrow band noise signal is included in the first demodulated received signal A1, provided that the first frequency A1 does not belong to these narrow bands. However, if the first frequency A is in the vicinity of a narrow band noise frequency, the narrow band noise signal and the broadcast signal are detected at the same time by the radio receiver 14. Due to this, beat noise is generated according to the second power component of these two signals produced during detection, so that deterioration of the signal product quality occurs. In other words, along with the broadcast signal $S_A$ and the wide band noise signal $N_A$ being included in the first demodulated received signal A1 which is outputted from the radio receiver 14, a beat noise signal $N_A'$ is also included.

Thus, in this embodiment of the present invention, the second frequency B is selected so that a frequency difference of the same level as the frequency difference between the first frequency A and a narrow band noise frequency is generated between the second frequency B and a narrow band noise frequency (i.e. between the second frequency B and a different one of the narrow band noise frequencies). For example, as shown in FIG. 8, if the first frequency A approaches one of the narrow band noise frequencies C2, the second frequency is set in the neighborhood of a narrow band noise frequency (for example the frequency C1) which is different from the narrow band noise frequency C2. Thus, it is arranged for the frequency difference (A–C2) between the first frequency A and the narrow band noise frequency C2 to be approximately equal to the frequency difference (B–C1) between the second frequency B and the narrow band noise frequency C1.

Thus, in this embodiment, since the single station receiver 15 is tuned to the second frequency B as described above, accordingly the pseudo broadcast carrier at the second frequency B and the narrow band noise signal at the narrow band noise frequency C2 are detected at the same time by the single station receiver 15. As a result, the same beat noise is generated by the second power component of these two signals produced during detection. In other words, along with the broadcast signal $S_B$ and the wide band noise signal $N_B$ being included in the second demodulated received signal B1 which is outputted from the single station receiver 15 as described above, a beat noise signal $N_B'$ also comes to be included. This beat noise signal $N_B'$ and the beat noise signal $N_A'$ are ones which are created in the same manner during narrow band noise generation, and they have a mutual correlation in amplitude and phase.

Figure 9:
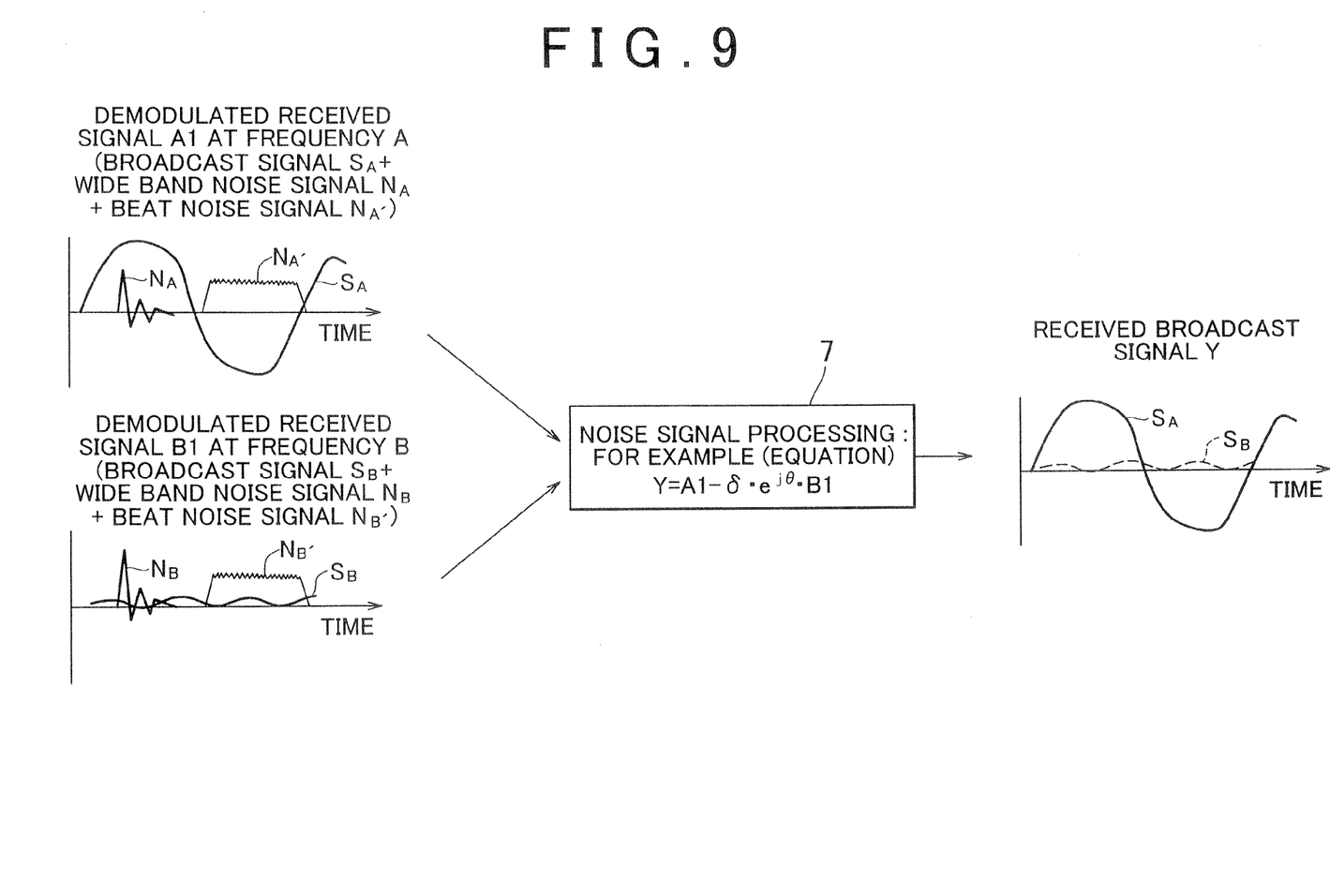
FIG. 9 is a block diagram schematically showing noise elimination processing by a signal processing circuit 17 of a third embodiment.

FIG. 9 is a block diagram schematically showing the noise elimination processing by the signal processing circuit 17 of this third embodiment. As explained with reference to the first embodiment of the present invention described above, the received broadcast signal Y is outputted by the signal processing circuit 17 by taking advantage of the correlation between the wide band noise signal $N_A$ which is included in the first demodulated received signal A1 and the wide band noise signal $N_B$ which is included in the second demodulated received signal B1. For example, noise elimination processing may be performed as expressed by the equation $Y=A1-d \cdot e^{j\Theta} \cdot B1$ as described above, so as to output the received broadcast signal Y. At this time, the same correlation is present between the beat noise signal $N_B'$ and the beat noise signal $N_A'$ as well. As shown in FIG. 9, not only is the wide band noise signal $N_A$ included in the first demodulated received signal A1 substantially eliminated, but also the beat noise signal $N_A'$ is substantially eliminated, so that it is possible to extract only the broadcast signal $S_A$ which is included in the first demodulated received signal A1.

In this manner, according to this embodiment of the present invention, using the pseudo broadcast carrier, the beat noise signal $N_B'$ which is correlated with the beat noise signal $N_A'$ is created in the second demodulated received signal B1, and, by performing noise elimination processing upon the first demodulated received signal A1 using this second demodulated received signal B1, it is possible to cancel, not only the wide band noise signal $N_A$ which is included in the first demodulated received signal A1, but also the beat noise signal $N_A'$ together therewith. Furthermore, it is possible to prevent deterioration of the quality of the first demodulated received signal A1, not only due to the wide band noise signal, but also due to the narrow band noise signal.

Figure 10:
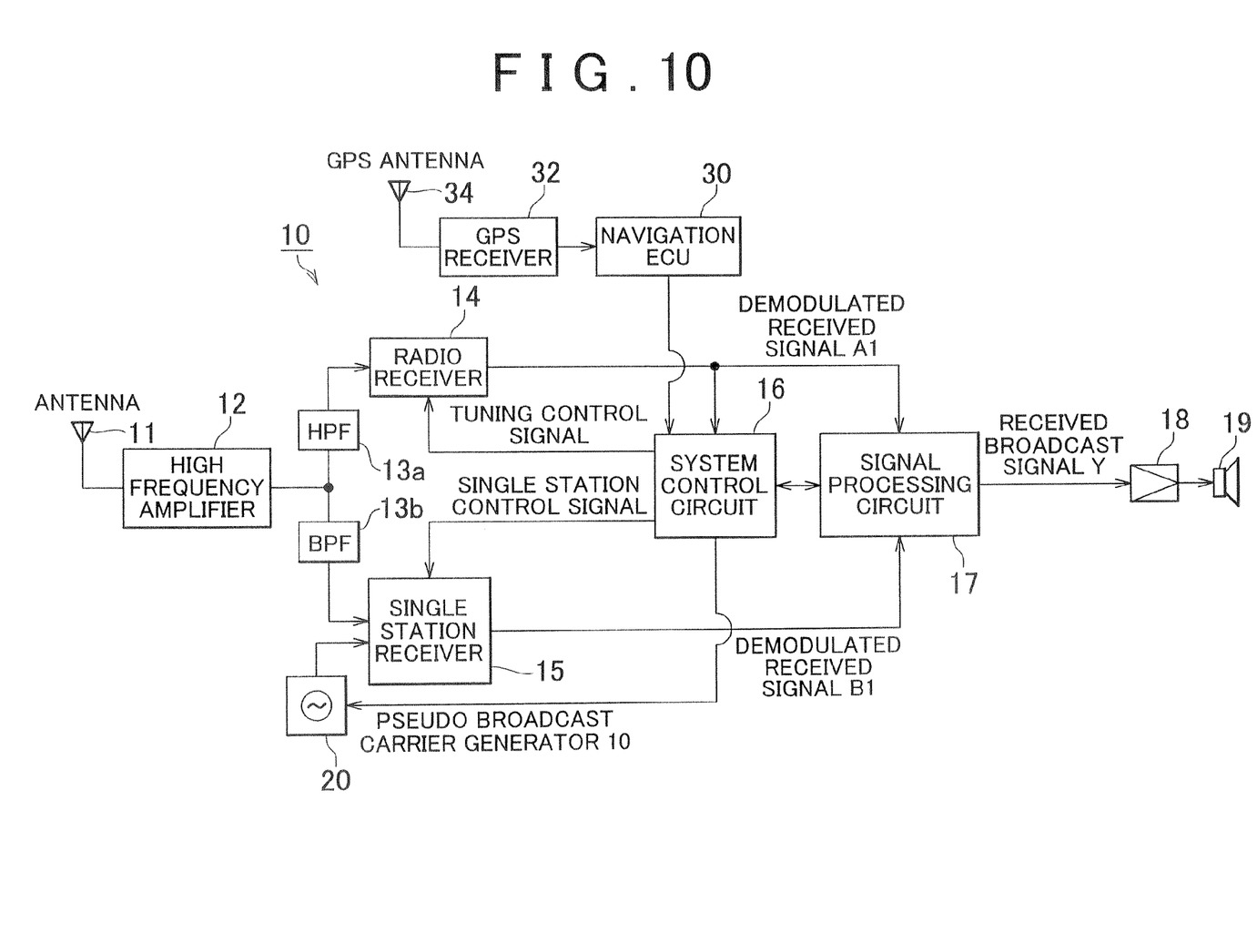
FIG. 10 is a structural system diagram showing the principal structure of an onboard reception device 10 according to a fourth embodiment.

FIG. 10 is a structural system diagram showing the principal structure of an onboard reception device 10 according to a fourth embodiment. In the following, to structures which are the same as ones described with reference to the third embodiment described above, the same reference symbols are affixed, and explanation thereof is curtailed. This fourth embodiment relates to a desirable selection method for the second frequency. It should be understood that although, in the following explanation of the structure of this fourth embodiment, the third embodiment is taken as a base of departure, it would also be possible to apply this fourth embodiment to the first embodiment or to the second embodiment described above, in an analogous manner.

As shown in FIG. 10, a navigation ECU 30 which implements the principal functions of a navigation device is connected to this system control circuit 16 via an appropriate communication network such as a CAN (Controller Area Network) or the like.

This navigation ECU 30 measures and calculates the current vehicle position, based upon GPS (Global Positioning System) signals which it receives via a GPS antenna 34 with a GPS receiver 32. As the position measurement method, any method is acceptable, such as the method of single position measurement or the method of relative position measurement (including interference position measurement) or the like. At this time, it would also be acceptable to compensate the result of this calculation of the position of the vehicle based upon the GPS signals, according to the outputs of various types of sensor such as a vehicle speed sensor or a gyro sensor or the like, or according to various types of information received via a beacon receiver or an FM multiplexed receiver. Or it would also be acceptable to perform appropriate compensation by a per se known map matching technique, using map data in a map data base. Furthermore, it would also be acceptable to perform differential compensation, based upon GPS compensation data which is supplied from a receiver which is installed at a location which is already known (i.e. a reference station).

The navigation ECU 30 creates an area map and reception station list for the current vehicle position, based upon the position information for the vehicle based upon the GPS signals, and upon a broadcasting station address list which is supplied. This broadcasting station address list is recorded in advance in a map data base, along with map data which includes various types of road information. This area map and reception station list for the current vehicle position is supplied to the system control circuit 16. This supply may, for example, be performed only when, during the movement of the vehicle, it has changed to another region (for example, when the vehicle has left the Tokai region and has entered into the Kinki region), so that the area map and reception station list has changed.

The system control circuit 16 refers to this area map and reception station list, and selects an optimum second frequency from among candidate frequencies upon which radio wave broadcasts cannot be received at the current vehicle position (i.e. frequencies upon which the broadcast waves are minimal or no broadcasting stations are present). In other words, based upon the area map and reception station list, the system control circuit 16 discovers a broadcasting station which cannot be received in the area related to the current vehicle position. And the system control circuit 16 creates a single station selection signal according to the second frequency which it has selected, and outputs this signal to the single station receiver 15. By doing this, the single station receiver 15 is tuned to the frequency (the second frequency which has thus been selected) according to the single station selection signal, as described above.

Accordingly, if for example the current vehicle position during movement of the vehicle transits from the Tokai region into the Kinki region, and if, in the Kinki region, broadcast radio waves upon the second frequency which is used in the Tokai region are allocated to some broadcasting station, then the system control circuit 16 refers to the area map and reception list and selects the optimum second frequency which can be used in the Kinki region, and changes the frequency to which the single station receiver 15 is tuned to this optimum second frequency in the Kinki region.

In this manner, according to this embodiment, it is possible, in consideration of the characteristic of the vehicle that it is mobile, to select the optimum second frequency based upon the position information for the vehicle, even if the ground region in which the vehicle is present changes.

Figure 11:
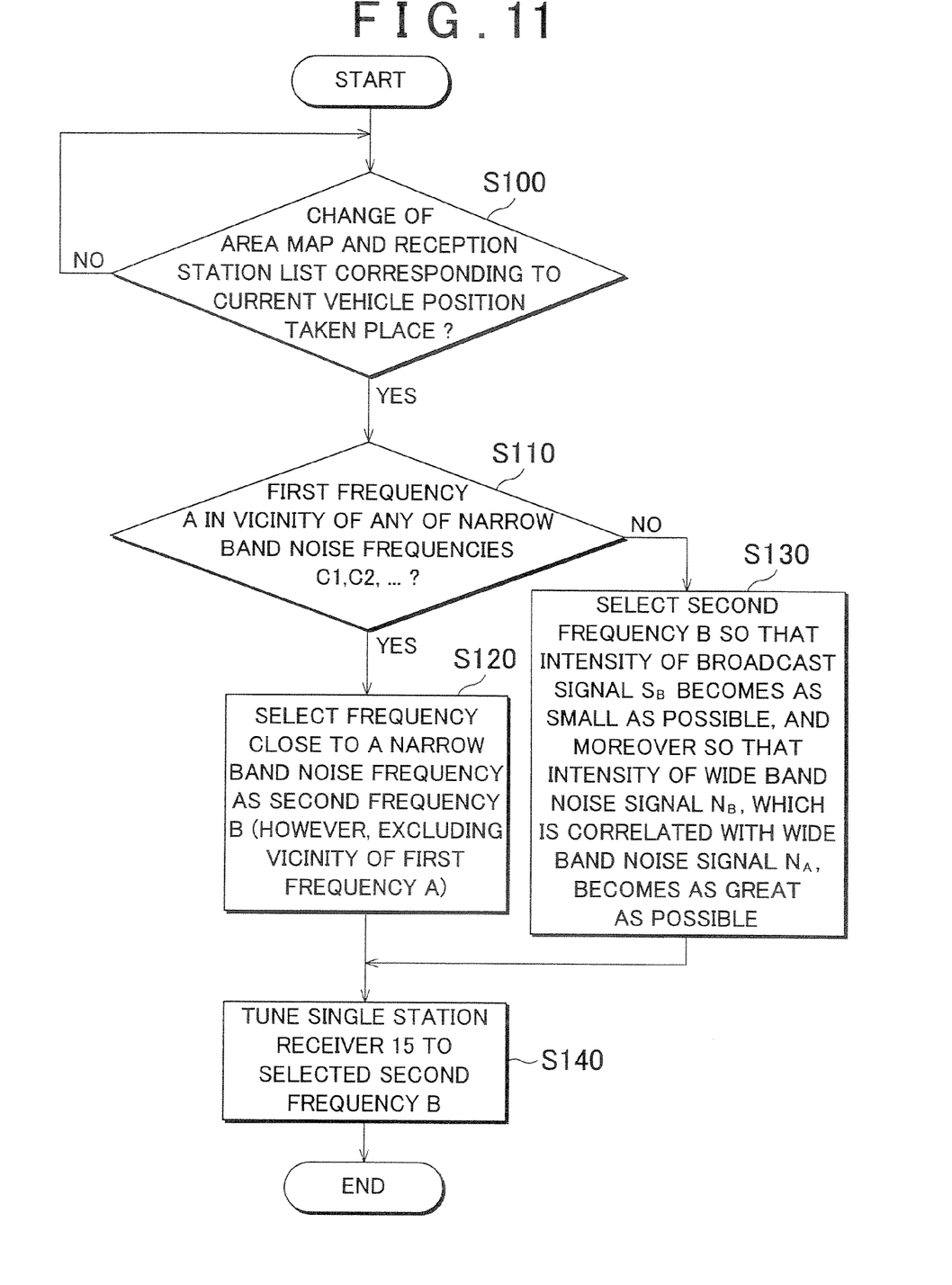
FIG. 11 is a flow chart showing an example of second frequency selection processing implemented by a system control circuit 16 of a forth this embodiment.

FIG. 11 is a flow chart showing an example of the second frequency selection processing implemented by the system control circuit 16 of this embodiment.

In a step 100, the system control circuit 16 decides, based upon the information from the navigation ECU 30, whether or not a change of the area map and reception station list which corresponds to the current vehicle position has taken place. If a change of the area map and reception station list has taken place, then the flow of control proceeds to the step 110.

In the step 110, the system control circuit 16 decides whether or not the first frequency A, to which the radio receiver 14 is tuned at the current time, is in the vicinity of any of the narrow band noise frequencies C1, C2, . . . . It should be understood that the narrow band noise frequencies C1, C2, . . . are derived in advance from the frequencies of the oscillation circuits and clock circuits and the like which are onboard, and are stored in a predetermined memory. If the first frequency A is in the vicinity of any one of the narrow band noise frequencies C1, C2, . . . , then since beat noise is generated, as explained in connection with the third embodiment described above, accordingly the flow of control proceeds to a step 120 in order to prevent deterioration of the quality of the received broadcast signal Y due to this beat noise. However, if the first frequency A is not in the vicinity of any one of the narrow band noise frequencies C1, C2, . . . , then the flow of control is transferred to a step 130.

In the step 120, the system control circuit 16 refers to the area map and reception station list, and selects, from among a plurality of frequency candidates upon which it is not possible to receive radio wave broadcasts at the current vehicle position, a frequency which is close to one of the narrow band noise frequencies C1, C2, . . . (however, excluding the vicinity of the first frequency A), and takes this selected frequency as the second frequency B.

In the step 130, the system control circuit 16 refers to the area map and reception station list, and selects a second frequency B, from among a plurality of frequency candidates upon which it is not possible to receive radio wave broadcasts at the current vehicle position, so that the reception level of the broadcast signal $S_B$ which survives in the received broadcast signal Y becomes as small as possible, and moreover so that the reception level of the wide band noise signal $N_B$, which is correlated with the wide band noise signal $N_A$, becomes as large as possible.

In the next step 140, the system control circuit 16 outputs a single station selection signal to the single station receiver 15, so as to tune the single station receiver 15 to the second frequency B which has been selected in the step 120 or the step 130 described above.

In this manner, according to this embodiment, it is possible to select an optimum second frequency B, according to the first frequency A to which the radio receiver 14 is tuned at the present time, and according to the ground area in which the vehicle is currently located.

It should be understood that, in this embodiment, it would also be acceptable for the noise elimination processing by the signal processing circuit 17 to be implement in hardware, using optimum compensation coefficients (for amplitude and phase compensation) which have been set in advance for each second frequency B. Or, it would also be acceptable to implement them using a DSP, based upon software which is programmed so as to cancel only noise signals for which the correlation is strong.

Furthermore, in this embodiment, it would also be acceptable to arrange for the signal which is received by the antenna 11 to be distributed to the radio receiver 14 and to the single station receiver 15 by a splitter, instead of by the filters 13a and 13b. With this structure, the freedom in selecting the optimum second frequency B as described above becomes great, since it is possible to change the second frequency B of the single station receiver 15 freely, without being limited to the low frequency region or to the high frequency region.

Moreover, if this fourth embodiment is also applied to the second embodiment described above, then it is possible to supply the received radio waves to the radio receiver 14 and to the single station receiver 15 independently via separate antennas 11a, 11b. Accordingly the second frequency B of the single station receiver 15 can be varied freely, without being limited to the low frequency region or to the high frequency region. As a result, the freedom in selecting the above described optimum second frequency B becomes great.

Although, in the embodiments described above, the radio broadcast transmission and reception device is constituted as an onboard reception device 10, it would also be possible to apply the present invention to a radio wave broadcast of a different type than a radio broadcast (such as a TV broadcast or a satellite broadcast or the like) as well. In the case of a TV broadcast, a speaker becomes the output means of that TV audio, while a display constitutes the output means for the TV video.

Furthermore although the embodiments described above relate to an onboard reception device 10 which receives broadcast radio waves, the present invention can also be applied to various types of receiver, such as the GPS receiver 32 described above and the like. Furthermore, it could also be applied to an onboard communication device, as for example represented by a vehicle telephone. In the case of such an onboard communication device, according to the same considerations as described above, the second frequency B may be set to a frequency for which the reception levels of various types of radio waves which are included in communication radio waves and broadcast radio waves is low. Accordingly, in this case, an embodiment is envisaged which is characterized by comprising, instead of the radio receiver 14, a reception filter and receiver which is tuned to a first frequency (a center frequency) which is allocated for wireless communication, a second receiver which is tuned to a frequency at which the reception levels of various types of radio wave which are included in communication radio waves and broadcast radio waves are low, a signal processing circuit 17 which cancels noise included in a first demodulated received signal which is demodulated by the first receiver based upon a second demodulated received signal which is demodulated by the second receiver, and an output means which outputs this first demodulated received signal in which the noise is cancelled.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less, or only a single element, are also to be considered as being within the spirit and scope of the invention.

What is claimed is:

1. An onboard reception device, comprising:
a first receiver which is tuned to demodulate a first signal having a carrier wave at a first frequency;
a second receiver which is tuned to demodulate a second signal having a carrier wave at a second frequency which is different from the first frequency, the second received signal having a reception level lower than a reception level of the first received signal;
a second frequency selection device which, when the first frequency is not in vicinity of predetermined narrow band noise frequencies, selects the second frequency from among a plurality of candidates based on candidate frequency having a wide band noise signal which has highest reception level and correlates with wide band noise signal of the first frequency;
a noise cancellation device which cancels noise included in the first demodulated received signal which is demodulated by the first receiver, based upon the second demodulated received signal which is observed by the second receiver; and
an output device which outputs the first demodulated received signal in which the noise has been cancelled, in a manner in which it can be appreciated by a user.

2. An onboard reception device according to claim 1, further comprising a pseudo carrier generator which generates a pseudo carrier at the second frequency, and wherein a radio wave signal which is supplied to the second receiver via an antenna is superimposed upon the pseudo carrier which is generated by the pseudo carrier generator.

3. An onboard reception device according to claim 2, wherein the second frequency is a frequency in the vicinity of a noise frequency which is emitted from a narrow band noise source of the vehicle, and the second frequency is selected close to frequency of the narrow band noise source of the vehicle such to prevent deterioration of first signal due to beat noise.

4. An onboard reception device according to claim 1, wherein the predetermined narrow band noise frequencies include a first narrow band noise frequency and a second narrow band noise frequency, and the second frequency is selected such that a frequency difference between the first frequency and the first narrow band noise frequency is of substantially same level as a frequency difference between the second frequency and the second narrow band noise frequency.

5. An onboard reception device according to claim 1, wherein a common antenna is connected to the first receiver and the second receiver via a splitter or a filter.

6. An onboard reception device according to claim 1, wherein separate individual antennas are connected to the first receiver and the second receiver.

7. An onboard reception device according to claim 6, wherein the antenna which is connected to the second receiver is provided in the vicinity of a wide band noise source of the vehicle.

8. An onboard reception device according to claim 1, wherein the second frequency is a frequency which is not allocated for any type of broadcast or wireless communication.

9. An onboard reception device according to claim 1, wherein the second frequency selection device selects the second frequency from among frequencies on which no radio wave broadcasts can be received at the current vehicle position, based upon vehicle position information based upon GPS signals.

10. An onboard reception device according to claim 1, wherein an operational state of the noise cancellation device is changed over between ON and OFF according to the reception level of the first demodulated received signal.

11. An onboard reception device according to claim 10, wherein, when the operational state of the noise cancellation device is changed over to OFF:
   the second receiver is tuned to a third frequency, which is a frequency different from the first frequency to which the first receiver is tuned, and in which the same information is included as in the first frequency; and
   when a radio wave reception is better on the third frequency than on the first frequency, the output device outputs a signal based upon the second receiver.

12. An onboard reception device, comprising:
   a first receiver which is tuned to demodulate a first signal having a carrier wave at a first frequency;
   a second receiver which is tuned to demodulate a second signal having a carrier wave at a second frequency which is different from the first frequency, the second received signal having a reception level lower than a reception level of the first received signal;
   a second frequency selection device which, when the first frequency is not in vicinity of predetermined narrow band noise frequencies, selects the second frequency from among a plurality of candidates based on candidate frequency having a wide band noise signal which has highest reception level and correlates with wide band noise signal of the first frequency;
   signal processing means for canceling noise included in the first demodulated received signal which is demodulated by the first receiver, based upon the second demodulated received signal which is observed by the second receiver; and
   output means for outputting the first demodulated received signal in which the noise is cancelled, in a manner in which it can be appreciated by a user.

13. A noise cancellation method for an onboard reception device, comprising:
   detecting a first frequency;
   selecting a second frequency from among a plurality of candidates, when the first frequency is not in vicinity of predetermined narrow band noise frequencies, based on candidate frequency having a wide band noise signal which has highest reception level and correlates with wide band noise signal of the first frequency;
   creating a first demodulated received signal having a carrier wave at the first frequency which has been detected;
   creating a second demodulated received signal having a carrier wave at the second frequency which has been detected;
   canceling noise included in the first demodulated received signal based upon the second demodulated received signal; and
   outputting the first demodulated received signal in which the noise has been cancelled.

* * * * *